No. 788,458. PATENTED APR. 25, 1905.
T. P. FARMER.
SAFETY TREAD.
APPLICATION FILED JUNE 6, 1904.
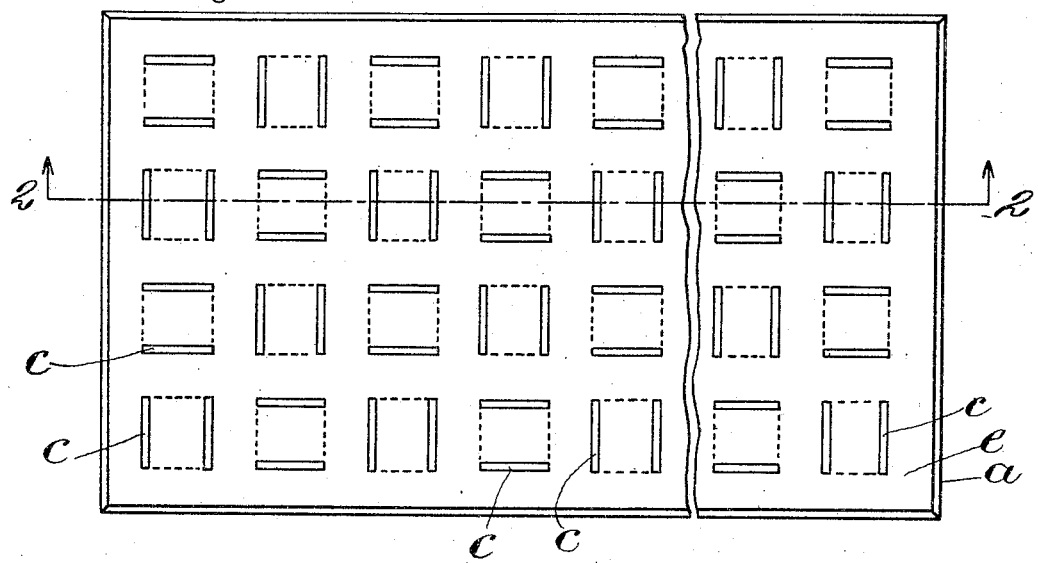
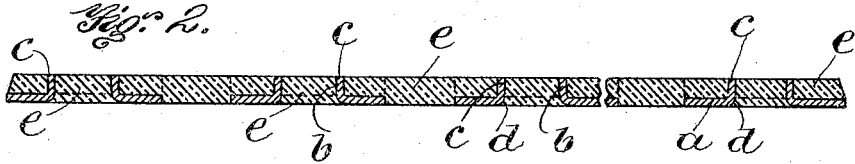
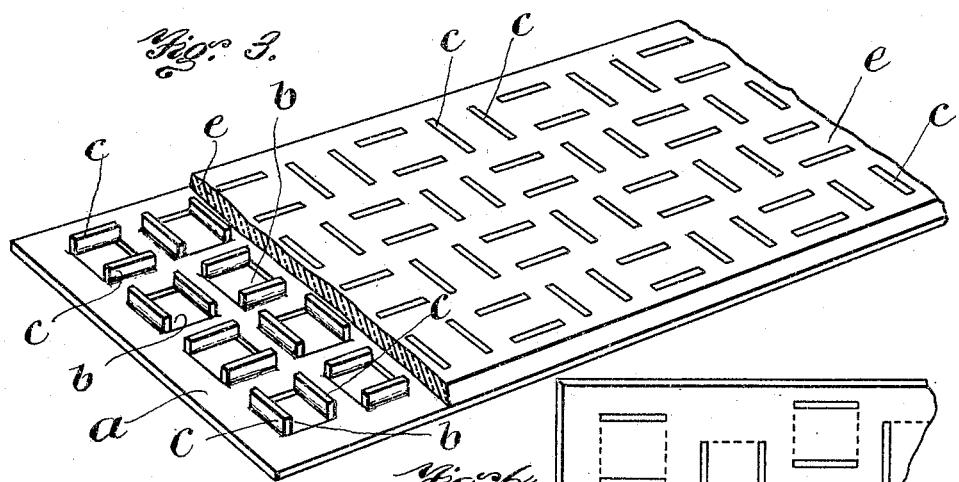
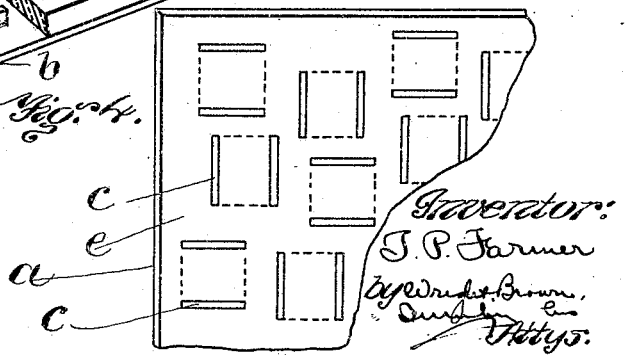
Witnesses:
C. C. Stecher
E. V. Batchelder
Inventor:
T. P. Farmer No. 788,458.

Patented April 25, 1905.

UNITED STATES PATENT OFFICE.

THEODORE P. FARMER, OF SOUTHWEST HARBOR, MAINE, ASSIGNOR TO PROTECTIVE TREAD COMPANY, OF BOSTON, MASSACHUSETTS, A CORPORATION OF MAINE.

SAFETY-TREAD.

SPECIFICATION forming part of Letters Patent No. 788,458, dated April 25, 1905.

Application filed June 6, 1904. Serial No. 211,294.

*To all whom it may concern:*

Be it known that I, THEODORE P. FARMER, of Southwest Harbor, in the county of Hancock and State of Maine, have invented certain new and useful Improvements in Safety-Treads, of which the following is a specification.

This invention has for its object to provide an antislipping or safety tread for surfaces exposed to wear—such as steps, landings, and the like—in which there is a maximum surface of slip-resistant material and a minimum exposure of its containing metallic frame.

Referring to the drawings which form a part of this specification, Figure 1 represents in plan view a safety-tread embodying the invention. Fig. 2 represents a section on the line 2 2 of Fig. 1. Fig. 3 represents a perspective view of the tread with a portion of the slip-resistant material broken away to show the construction of the base-plate. Fig. 4 represents another embodiment of the invention.

Referring to the drawings, a frame is shown as comprising a soft-steel base-plate $a$. This may be of any suitable shape in plan view in order that it may fit the surface exposed to wear. This plate has a plurality of apertures $b$. Each aperture is shown as square, and it is formed by punching the plate with a series of H-shaped cuts. The tongues formed by these cuts are bent upward, as at $c$, at right angles to the base-plate and parallel to each other, there being two upstanding lugs or walls for each aperture. As shown in Fig. 1, the apertures are arranged in rows both longitudinally and transversely of the plate $a$ to form holders for the antislipping material, the walls of each adjacent pair of apertures in the longitudinal and transverse rows being at right angles to each other, so that beyond the ends of each pair of walls there is a wall at right angles thereto. In Fig. 4, however, it will be observed that the apertures $b$ are arranged irregularly in the plate; but the upright walls of one aperture are at an angle to the walls of the adjacent apertures. These walls are turned up by any suitable mechanism that may be employed for the purpose, such as dies or similar tools. The upper edges of all of the upright walls are in the same plane, as best shown in Fig. 2.

As the antislipping material, I preferably employ lead in sheet form, though I may employ rubber. This sheet $e$ of lead is laid upon the frame and is pressed downward firmly thereupon, so that it is crowded into the apertures $b$ and into the intersecting channels between the upright retaining-walls $c$; but if sheet-rubber is used it is vulcanized in place. As a result of this the apertures are filled with plugs or blocks of slip-resistant material, said plugs or blocks being integral with the remainder of the sheet which covers the channels between the apertures.

A tread constructed as above described presents a maximum surface of slip-resistant material with a minimum exposure of relatively harder metal. As the said material gradually wears away its surface is undiminished in area and at the same time the harder metal surface is not increased in area, as is commonly the case with treads as hitherto constructed.

One of the advantages of the tread constructed as hereinbefore described is that the base-plate is covered by an integral sheet of slip-resistant material, which is pressed into intimate contact with the plate and with the upstanding walls, so as to fill the apertures formed in the plate, in consequence of which it is impossible for water, ice, or foreign substances to work between the slip-resistant material and the plate and its upstanding walls. The bending upward of the walls $c$ causes a slight enlargement of the space betwen them in the plane of the under surface of the plate, and the spreading of the slip-resistant material in the apertures, as indicated at $d$, serves to completely lock the sheet to the plate. In virtue of this construction, in which some of the opposing straight walls are angularly disposed to the remainder of the straight walls, the antislipping material is more securely locked to the plate, and it is practically impossible for the antislipping material to be stripped from the plate without considerable labor.

Having thus explained the nature of the invention and described a way of constructing and using the same, although without attempting to set forth all of the forms in which it may be made or all of the modes of its use, I declare that what I claim is—

1. A safety-tread comprising a base-plate having a plurality of pairs of walls bent upward from the face thereof to form rows of holders, some of said pairs of walls in each row being angularly disposed to the remainder of the walls in said row, and a sheet of slip-resistant material covering substantially the entire face of said plate and held thereon by said walls.

2. A safety-tread comprising a base-plate having a plurality of apertures each formed by punching and bending upward straight parallel walls, the walls of some of the apertures being angular to those of the remaining apertures, and a sheet of slip-resistant material covering the face of said plate and filling said apertures, the upper surface of said sheet being substantially flush with the upper ends of said walls.

In testimony whereof I have affixed my signature in presence of two witnesses.

THEODORE P. FARMER.

Witnesses:
  MARCUS B. MAY,
  C. C. STECHER.